UNITED STATES PATENT OFFICE.

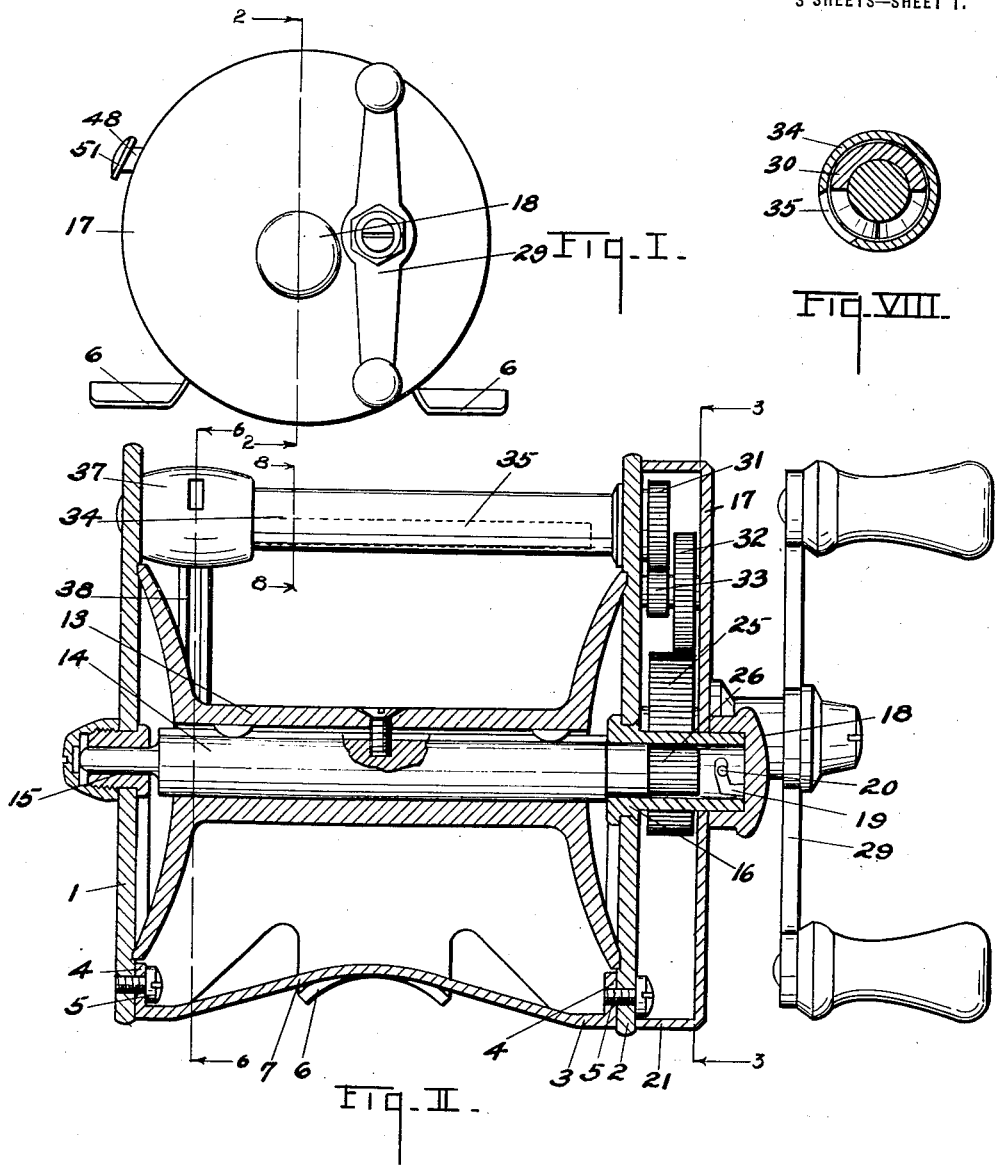

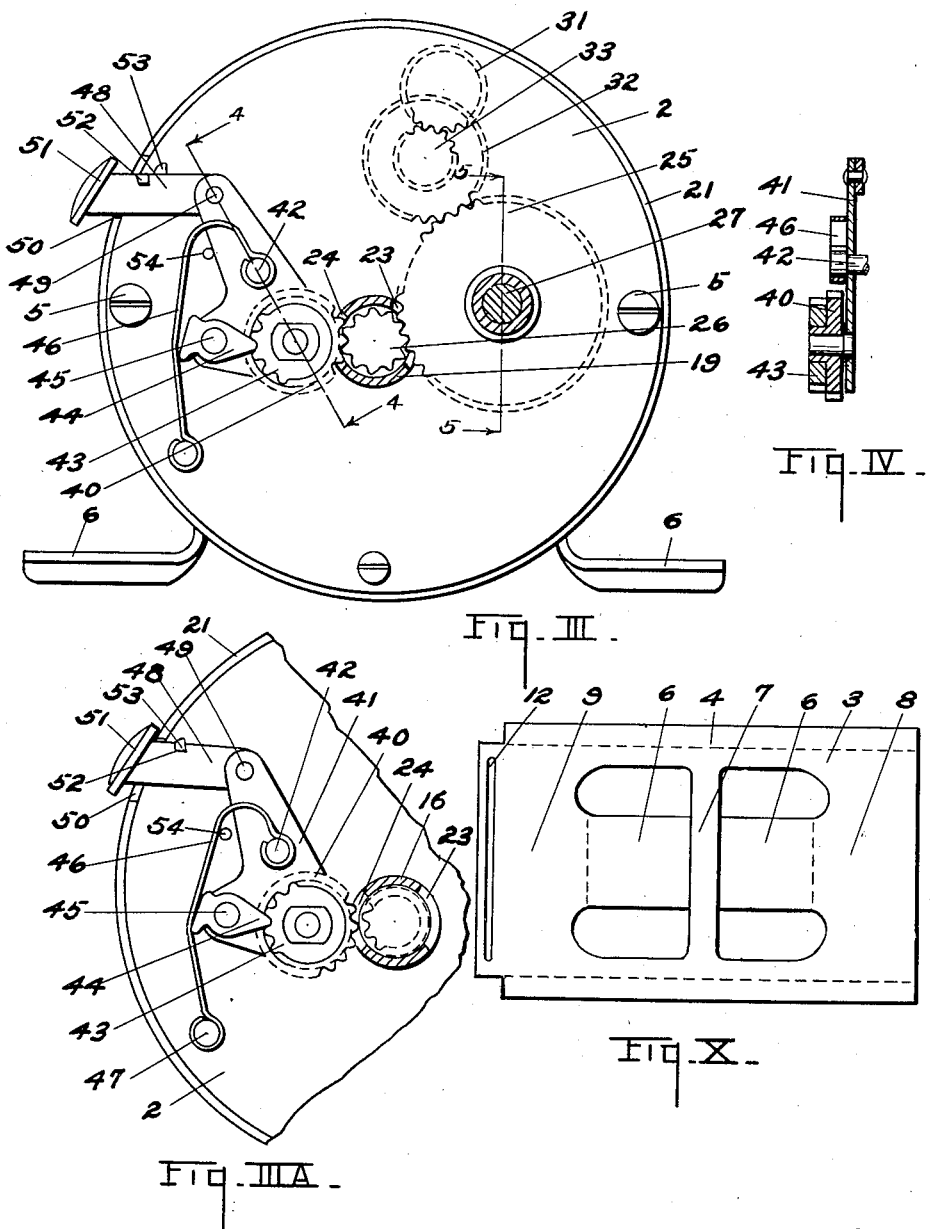

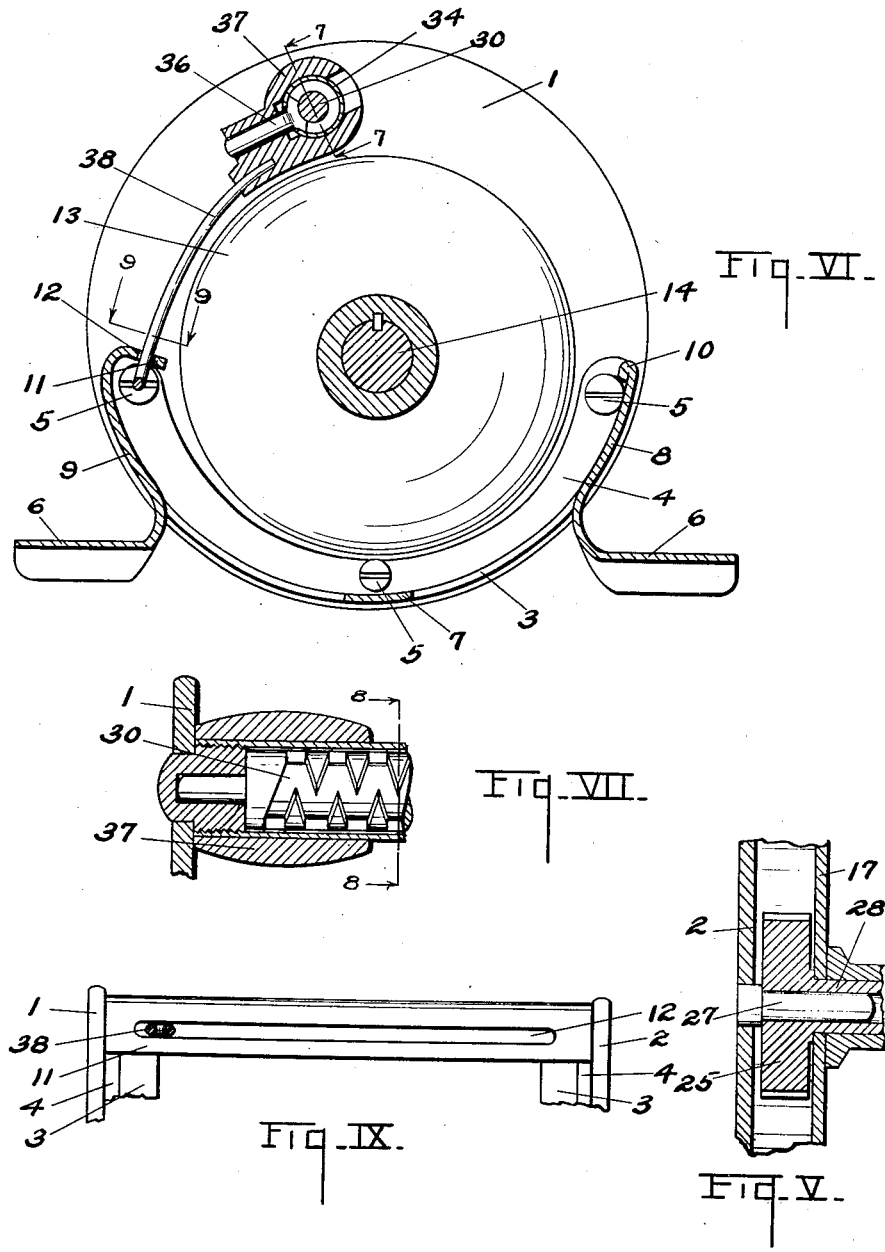

WILLIAM SCHMID, OF KALAMAZOO, MICHIGAN.

FISHLINE-REEL.

1,363,817.                    Specification of Letters Patent.    Patented Dec. 28, 1920.

Application filed September 5, 1919. Serial No. 321,910.

*To all whom it may concern:*

Be it known that I, WILLIAM SCHMID, a citizen of the United States, residing in the city and county of Kalamazoo, State of Michigan, have invented certain new and useful Improvements in Fishline-Reels, of which the following is a specification.

This invention relates to improvements in fish line reels.

The main objects of this invention are:

First, to provide in a fish line reel an improved frame structure which is very rigid and at the same time is simple and economical in its parts.

Second, to provide in a fish line reel an improved structure in which the driving gear and other parts inclosed within the head chamber may be quickly exposed.

Third, to provide in a fish line reel an improved level winding mechanism which is compact and simple in structure.

Fourth, to provide in a fish line reel an improved level winding mechanism drive.

Fifth, to provide in a fish line reel an improved click mechanism.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a head end view of a fish line reel embodying the features of my invention.

Fig. II is a detail view partially in longitudinal section on a line corresponding to line 2—2 of Fig. I.

Fig. III is a view on a line corresponding to line 3—3 of Fig. II, the rim of the head member being omitted.

Fig. III^A is a detail view corresponding to Fig. III showing the click mechanism in inoperative position.

Fig. IV is a section through the click mechanism on a line corresponding to line 4—4 of Fig. III, parts being shown in full lines for convenience in illustration.

Fig. V is a detail view partially in section on a line corresponding to line 5—5 of Fig. III showing details of the driving mechanism.

Fig. VI is a transverse section on a line corresponding to line 6—6 of Fig. II showing details of the frame structure and of the level winding mechanism.

Fig. VII is a detail view partially in section on a line corresponding to line 7—7 of Fig. VI showing details of the level winding mechanism.

Fig. VIII is a sectional view on a line corresponding to line 8—8 of Fig. VII.

Fig. IX is a detail view partially in section on a line corresponding to line 9—9 of Fig. VI.

Fig. X is a plan view of the blank from which the longitudinal frame member is formed.

In the drawing similar reference characters refer to similar parts throughout the several views, and the sectional views are taken looking in the direction of the little arrows at the ends of the section lines.

Referring to the drawing, the frame of my improved reel comprises a pair of disk-like end members 1 and 2 which are connected by a longitudinal U shaped frame member 3 formed as a stamping and having upturned flanges 4 at its ends secured to the end members by means of the screws 5. This frame member 3 extends upwardly a substantial distance on the end members so that they are rigidly supported without the necessity of additional pillars.

Portions of the frame member are struck outwardly to provide reel seat members 6. The blank from which the frame member illustrated is formed is shown in Fig. X.

As illustrated, the frame member comprises three connected longitudinal bars, 7, 8 and 9. The upper edge of the bar 8 is folded over at 10 to provide a smooth or rounded edge. The upper edge of bar 9 is turned inwardly into a flange 11 having a longitudinal slot 12 therein adapted to receive the line guide eye as will be hereinafter described, the flange also providing a smooth edge over which the line travels. The main body of the frame is thus formed of three members with the addition of their connecting screws.

The spool 13 is provided with a shaft 14 journaled at one end in the bearing 15 carried by the end member 1. At its other end the shaft is journaled in a bearing member 16 mounted on the end member 2. The bearing member 16 projects through the head member 17 to receive the caplike clamping or retaining member 18, the bearing member having bayonet slots 19 therein and the cap member having coacting pins 20 so that the head member is removably secured.

The head member 17 has peripheral flanges 21 abutting the end member 2 providing a chambered head for the frame. The bearing member 16 has openings 23 and 24 in the sides thereof opening within the head.

The driving gear 25 meshes with the spool pinion 26 through the opening 23. The driving gear 25 is supported on the stub shaft 27 carried by the frame end member 2. The driving gear 25 has a hub 28 extending through the head member 17 to receive the crank 29.

A reversely threaded traversing screw 30 is journaled in the end members near the top thereof. On the head end of this traversing screw is a pinion 31 disposed in the head chamber. This pinion is connected to the driving gear by the connecting pinions 32 and 33, the gear 32 being in mesh with the driving gear 25 while the gear 33 is in mesh with the traversing screw pinion 31. The gears 32 and 33 are connected and mounted on a stub shaft carried by the end member 2.

The traversing screw is provided with a tubular housing 34 longitudinally slotted at 35 to receive the pawl 36 which engages the screw threads. A carriage 37, driven by this pin, is reciprocatingly mounted on the housing 34. The carriage carries a line guide eye 38 which projects downwardly through the slot 12 in the frame member 3 whereby the end of the line guide eye is protected and supported against distortion.

I provide a detent consisting of a pinion 40 mounted on a support 41 pivoted at 42 on the end plate 2. This pinion 40 has a click pinion 43 connected thereto. A detent or click 44 is pivoted at 45 on the support to coact with this pinion 43. A spring 46 is arranged to engage this detent 44 holding it yieldingly in engagement and also urging the support to its operative position. One end of this spring is connected at 47 to the frame member 2 and the other is mounted on the pivot 42.

A latch 48 is pivoted at 49 on the support to project through an opening 50 in the head, the latch being provided with a finger piece 51 for convenience in manipulation. The latch is notched at 52 to engage with a keeper 53 on the end member 2 thereby holding the pinion in an operative position. When this latch is released the spring actuates the support to bring the pinion 40 into mesh with the click pinion through the opening 24 in the bearing member 16. A stop 54 is provided for the support when in its engaging position so that proper meshing of the gear with the spool pinion is secured. With the parts thus arranged, the click or detent does not directly engage the spool pinion as is quite common practice and which necessarily subjects the pinion to wear.

My improved fish line reel is quite simple and economical to produce and at the same time very desirable in that it has an efficient and compact level winding mechanism, and the frame is light and rigid.

I have illustrated and described one embodiment of my improvement which I consider very practical. I have not attempted to illustrate or describe other embodiments or adaptations as I believe the disclosure made will enable those skilled in the art to embody or adapt my improvements as may be desired.

Having thus described my invention, what I claim as new and desire to secure by Letters Patent is:

1. In a fishing reel, the combination of a frame comprising a pair of end members and a U-shaped pillar member formed as a stamping disposed between said end members and having upturned flanges at its ends secured thereto, one end of said pillar member being turned inwardly and longitudinally slotted, a traversing mechanism comprising a line guide projecting downwardly through said slot in said pillar member, a spool, and driving means for said spool and traversing mechanism.

2. In a fishing reel, the combination of a frame comprising a pair of end members and a U-shaped pillar member formed as a stamping disposed between said end members and having upturned flanges at its ends secured thereto, said pillar member having portions struck therefrom providing outturned reel seat members, one end of said pillar member being turned inwardly and longitudinally slotted, a traversing mechanism comprising a line guide projecting downwardly through said slot in said pillar members, a spool, and driving means for said spool and traversing mechanism.

3. In a fishing reel, the combination of a frame comprising a pair of end members and a U-shaped pillar member formed as a stamping disposed between said end members and having upturned flanges at its ends secured thereto, a traversing mechanism comprising a line guide projecting downwardly through said slot in said pillar members, a spool, and driving means for said spool and traversing mechanism.

4. In a fishing reel, the combination of a frame comprising a pair of end members and a U-shaped pillar member disposed between said end members and secured thereto, a traversing mechanism comprising a line guide disposed with its end within said pillar member, a spool, and driving means for said spool and traversing mechanism.

5. In a fishing reel, the combination of a frame comprising a pair of end members and a U-shaped pillar member disposed between said end members and secured thereto, said pillar member having out-turned reel seat members, a traversing mechanism comprising a line guide disposed with its end within said pillar member, a spool, and driving means for said spool and traversing mechanism.

6. In a fishing reel, the combination of a frame comprising a pair of end members and a U-shaped pillar member formed as a stamping disposed between said end members and secured thereto, said pillar member having integral reel seat members, one end of said pillar member being turned inwardly and longitudinally slotted to receive a line guide eye.

7. In a fishing reel, the combination of a frame comprising a pair of end members and a U-shaped pillar member formed as a stamping disposed between said end members and secured thereto, said pillar member having integral reel seat members.

8. In a fishing reel, the combination of a frame comprising a pair of end members and a U-shaped pillar member formed as a stamping disposed between said end members and secured thereto, one end of said pillar member being turned inwardly and longitudinally slotted to receive a line guide eye.

9. In a fishing reel, the combination of a frame comprising an end member, a head member having a peripheral flange abutting said end member, a spool shaft bearing member mounted on said end member and extended through said head member and having a bayonet joint slot in its outer end and a side opening within said head member, a cap on said bearing member provided with a pin coacting with said joint slot whereby said head member is retained, a spool provided with a shaft having a pinion within said bearing member, a driving gear arranged within said head member to mesh with said pinion through said opening in said bearing member, a stub shaft for said driving gear mounted on said end member, and a driving crank on said head member connected to said driving gear.

10. In a fishing reel, the combination of a frame comprising an end member, a head member having a peripheral flange abutting said end member, a spool shaft bearing member mounted on said end member and extended through said head member and having a bayonet joint slot in its outer end and a side opening within said head chamber, a cap on said bearing member provided with a pin coacting with said joint slot whereby said head chamber is retained.

11. In a fishing reel, the combination of a frame comprising an end member, a head member, a spool shaft bearing member mounted on said end member and extended through said head member, a securing means for said head member mounted on said bearing member, a spool provided with a shaft having a pinion within said bearing member, a driving gear arranged within said head member to mesh with said pinion, a stub shaft for said driving gear mounted on said end member, and a driving crank on said head member connected to said driving gear.

12. In a fishing reel, the combination of a frame comprising an end member, a head member, a spool shaft bearing member mounted on said end member and extended through said head member and a securing means for said head member mounted on said bearing member.

In witness whereof, I have hereunto set my hand and seal in the presence of two witnesses.

WILLIAM SCHMID. [L. S.]

Witnesses:
 LUELLA G. GREENFIELD,
 GRACE B. THOMPSON.